United States Patent [19]
Walker

[11] Patent Number: 6,083,132
[45] Date of Patent: Jul. 4, 2000

[54] FREE FLOATING BELT IDLER

[75] Inventor: Howard F. Walker, Toppenish, Wash.

[73] Assignee: Moxee Innovations Corporation, Moxee, Wash.

[21] Appl. No.: 09/072,888

[22] Filed: May 4, 1998

[51] Int. Cl.[7] ....................................................... F16H 7/08
[52] U.S. Cl. ........................... 474/111; 474/101; 474/140
[58] Field of Search .................................... 474/101, 117, 474/111, 133–140, 118, 113, 114, 196–198

[56] References Cited

U.S. PATENT DOCUMENTS

| | | |
|---|---|---|
| 68,625 | 9/1867 | Hawley . |
| 1,338,405 | 4/1920 | Stickney . |
| 1,499,920 | 1/1923 | Godden .............................. 474/197 X |
| 2,897,683 | 8/1959 | Carver . |
| 3,313,168 | 4/1967 | Matthews ............................ 474/197 X |
| 3,575,058 | 4/1971 | Kraus . |
| 3,630,096 | 12/1971 | Brewer . |
| 3,926,063 | 12/1975 | Mayfield . |
| 3,941,006 | 3/1976 | Brodesser . |
| 4,068,535 | 1/1978 | Sheets . |
| 4,662,862 | 5/1987 | Matson . |
| 4,798,562 | 1/1989 | Matson et al. . |
| 4,850,934 | 7/1989 | Gibson, Jr. et al. . |
| 4,892,508 | 1/1990 | Ryan et al. .............................. 474/101 |
| 5,000,724 | 3/1991 | Reid . |
| 5,457,967 | 10/1995 | Scherzinger . |

FOREIGN PATENT DOCUMENTS 2 092 705   8/1982   United Kingdom .

Primary Examiner—David A. Bucci
Assistant Examiner—Marcus Charles
Attorney, Agent, or Firm—Christensen O'Connor Johnson & Kindness PLLC

[57] ABSTRACT

A free floating tensioning device (10) for a conventional drive system that contains upper and lower stationary guide members (16) and (18) that are located on the outer edges of the upper and lower runs of the drive element (15) and bias the runs inwardly towards each other. The inwardly facing surfaces of the stationary guide member (16) and (18) are configured to form U-shaped channels (20) each with a bottom surface (22) and substantially vertical sidewalls (24). The guide members further includes two contact rollers (30) which are mounted within the U-shaped channels (20) to rollably engage the flexible drive element (15). Upper and lower spring clips (36) and (38) are secured to the outer surfaces of the stationary guide members (16) and (18). Left and right connecting side arms (40) and (42) are operatively associated with the spring clips (36) and (38) of the stationary guide members (16) and (18) to adjustably secure the guide members a selected distance from one another, thereby adjusting the tensioning device (10) so as to apply a suitable tensioning force to the drive element (15).

26 Claims, 2 Drawing Sheets

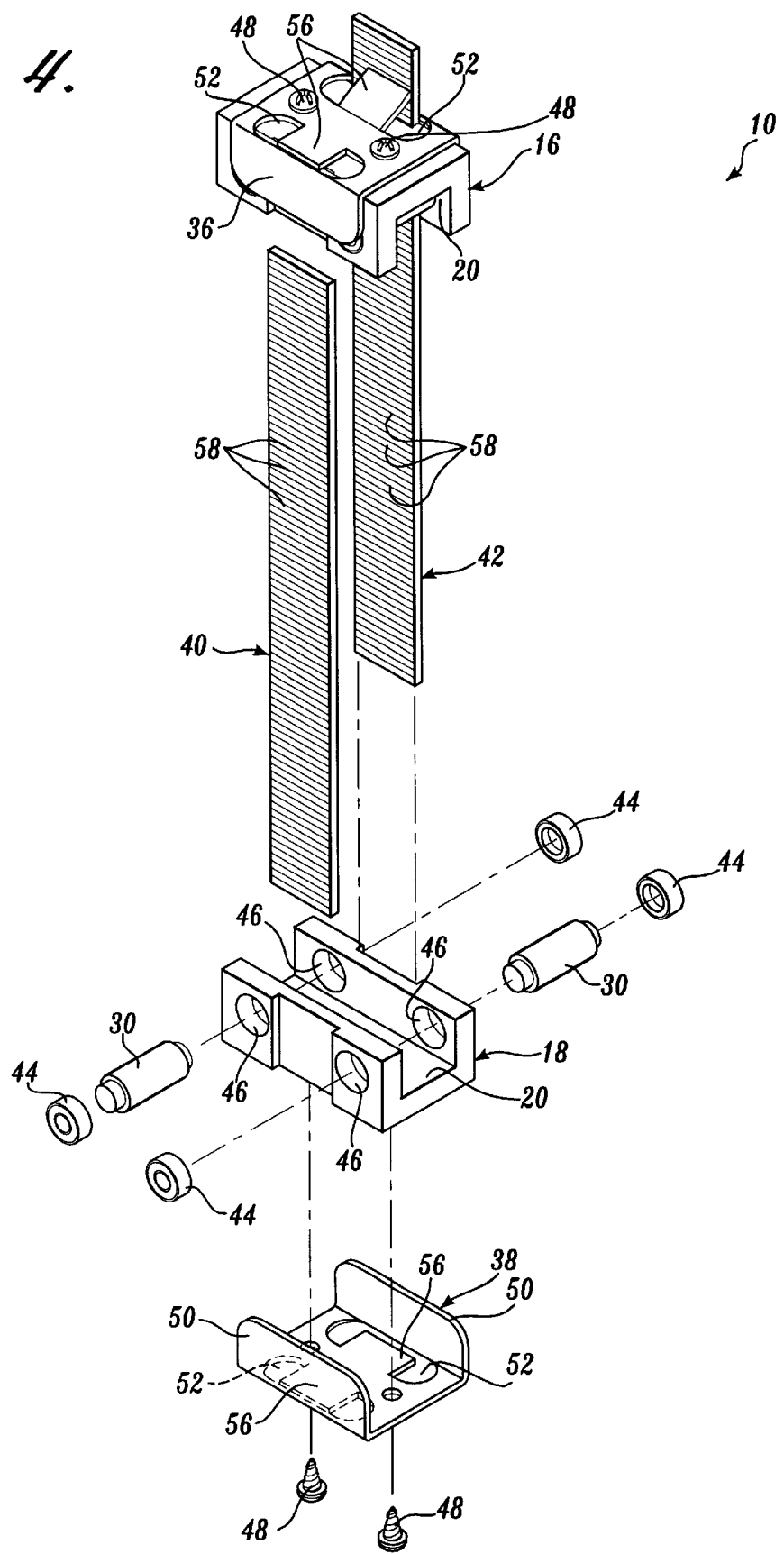

FREE FLOATING BELT IDLER

FIELD OF THE INVENTION

The present invention relates to tensioning devices for drive systems that include flexible drive elements such as drive belts and drive chains.

BACKGROUND OF THE INVENTION

The present invention is adapted for use with a conventional drive system in which a driven sprocket and a drive sprocket are connected by a flexible drive element such as a drive belt. In such an arrangement, it is well known that the proper functioning of the drive system and the operating life of the drive belt can be significantly enhanced by maintaining the two drive belt runs between the sprockets in tension such that significant slack does not occur in either run. One method of providing such tension is to resiliently bias the sprockets away from one another. However, a more convenient arrangement is provided by a tensioning device that biases one or both drive belt runs inwardly towards the other run at a point intermediate the sprockets. This arrangement provides the added advantage of keeping a greater surface area of the drive belt in contact with the outer surface of the sprockets at any given period of time. A number of examples of this latter type of tensioning device are disclosed in the prior art. However, in the great majority of prior tensioning devices, the tensioning device is adapted to operate in a particular drive system, e.g., to operate with a given arrangement of sprockets and drive belt.

One result of the fact that prior tensioning devices have been adapted for specific applications is that most such devices have been mounted or secured to a support that is fixed with respect to the sprocket axles. Through use of such a support arrangement, the position of the tensioning device between the sprockets cannot be controlled, to maintain the tensioning device at the optimum position. The use of fixed supports has been viewed as especially important for tensioning devices adapted to operate with sprockets that are or may be horizontally positioned with respect to one another. In such a horizontal arrangement, the weight of the tensioning device does not affect its position, i.e., the position of the tensioning device between the sprockets is not in any way controlled by gravity acting on the tensioning device.

A further feature of the majority of prior art tensioning devices is that in such devices, the surfaces contacting the two runs of the drive belt and urging them inward are either fixed in position with respect to one another, or resiliently biased towards one another by springs or similar means. A disadvantage of the resilient biasing technique is that it adds complexity to the tensioning device, and the spring or other resilient means are themselves subject to wear over time. Tensioning devices having fixed distances between their contact surfaces cannot be adjusted as the belt experiences increased wear. Thus, the tensioning force provided by the device decreases over time, at least in those arrangements where the sprockets are horizontally positioned with respect to one another. A further disadvantage of a fixed distance between the contact surfaces is that the tensioning device cannot be used with different sized sprockets.

One attempt to overcome the drawbacks of the prior art has been provided by the belt tensioner disclosed in U.S. Pat. No. 4,068,535 to Sheets. This device utilizes upper and lower idler assemblies, each of which carries significantly longitudinally spaced rollers, which are adjustably connected by threaded rods. However, this device is not easily adjusted, due to the need to undo locking washers and nuts, and is not compact, due to the widely spaced rollers. Thus, this device is not well suited for use on drive belts which operate in closely confined spaces. Further, the rollers included in this device are mounted on axles, which increases the complexity of assembly and may be subject to wear.

Additional partial solutions for tensioning drive mechanism tensioners are provided by the chain tensioners disclosed in U.S. Pat. Nos. 4,662,862 to Matson, 4,798,562 to Matson et al. and 4,850,934 to Gibson Jr. et al. These devices provide upper and lower low friction drive chain contact members that glide on chain surfaces, and which are incremented by adjustable straps. The straps are readily adjusted to change the spacing of the contact members, particularly in a disclosed ratcheting strap version. However, these devices, while well suited for use on chains, are not as well suited for use on belts due to the increased friction associated with belt contact on the contact members.

SUMMARY OF THE INVENTION

The present invention discloses a tensioning device for use with a drive system having a flexible drive element extending between sprockets, pulleys or the like. The tensioning device contains first and second guide members that each have an inwardly facing surface configured to form a U-shaped guide channel. The guide members mount on the outside of both drive element runs and bias the runs inwardly towards each other. The guide members are stationary with respect to the tensioning device, while the entire tensioning device is free to float longitudinally on the drive element under drive forces. Each guide member contains at least two rotational contact rollers that are mounted in the guide channels for rollably engaging with the drive element. At least one connecting side arm extends between the first and second stationary guide members to adjustably secure the members a selected distance from one another. Each stationary guide member further contains a spring clip. The clips are configured to selectively secure the guide members to the connecting side arms at a plurality of positions along the connecting side arm.

In a preferred embodiment of the present invention, the tensioning device is free floating, being supported solely by the runs of the drive element. The U-shaped guide channels define sidewalls that assist in centering and guiding the drive element. Each stationary guide member contains two contact rollers. These contact rollers are axle-less pin rollers and are mounted in bearings that are press-fit into the sidewalls defined by the guide channels. The tensioning device contains two connecting side arms that are adjustably secured to the stationary guide members by spring clips. The spring clips are preferably also U-shaped and mount over the back of the guide members such that the press-fit bearings are secured in the guide members. In a preferred aspect, the spring clip includes a ratchet-like mechanism arranged such that the force required to move the guide members towards one another is smaller than the force required to move the guide members away from one another.

A tensioning device constructed in accordance with the present invention can compactly and efficiently provide desirable tensioning of flexible drive elements, and in particular drive belts, in a drive system without many of the limitations encountered by devices in the prior art. The compact size of this free floating tensioning device allows it to be utilized in a variety of applications for which larger traditional tensioning devices or tensioning devices designed for a specific application are unsuitable. The press-fit axle-less pin rollers allow the friction reducing benefits received from rolling engagement of a flexible drive element to be obtained from this small but efficient device. Further, the compact double roller design results in enhanced centering of the drive element and force distribution.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 illustrates an exploded perspective view of the tensioning device of FIG. 1.

DETAILED DESCRIPTION OF THE PREFERRED EMBODIMENT

Figure 1:
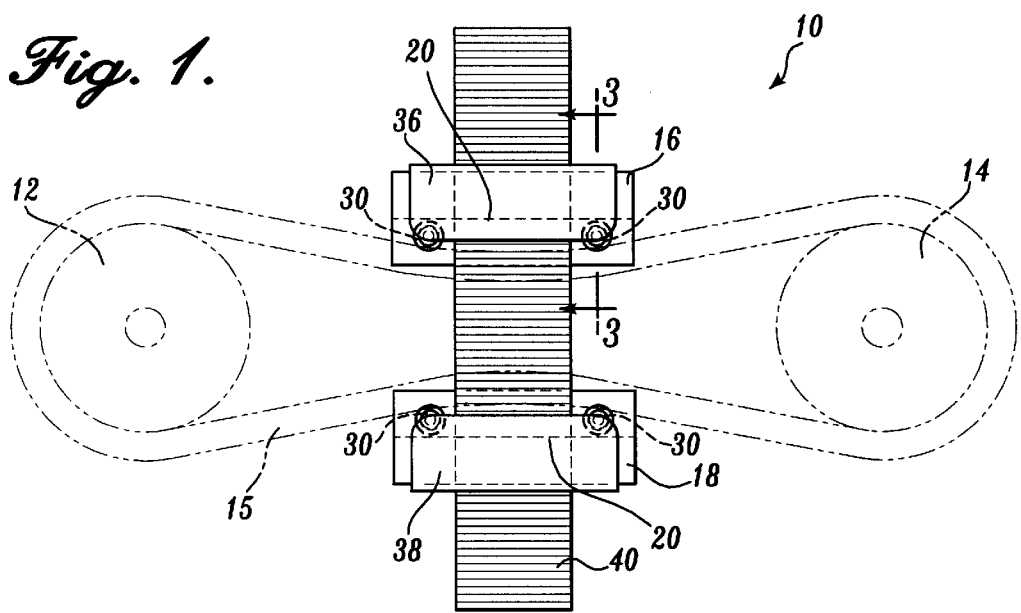
FIG. 1 illustrates a side elevation view of the tensioning device of the present invention used in connected with a drive belt.
Figure 2:
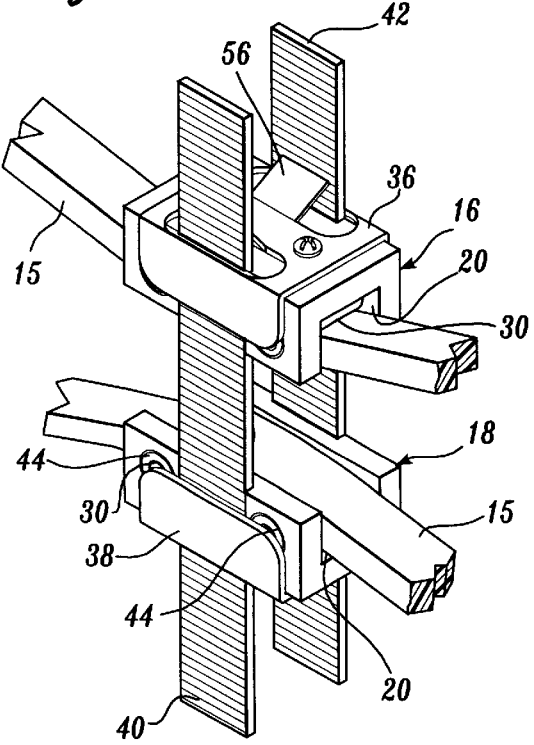
FIG. 2 illustrates a perspective view of the tensioning device of FIG. 1, engaged to the upper and lower runs of a partially shown drive belt.
Figure 3:
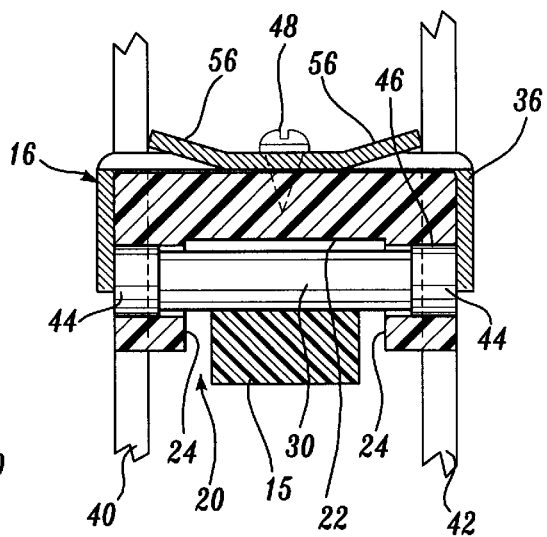
FIG. 3 illustrates a cross-sectional view of the upper portion of the tensioning device of the present invention taken along line 3—3 of FIG. 1.

FIGS. 1 and 2 illustrate a preferred embodiment of a tensioning device 10 constructed in accordance with the present invention used in connection with a conventional drive system that includes sprockets 12 and 14 interconnected by a flexible drive element 15 which is preferably a flat drive belt. The tensioning device 10 includes upper and lower stationary guide members 16 and 18 that are located on the outer edges of the upper and lower runs of the drive element 15 and bias the runs inwardly towards each other. The inwardly facing surface of each stationary guide member 16 and 18 is configured to form a U-shaped channel 20 with a bottom surface 22 and substantially vertical sidewalls 24 (FIG. 3). Each stationary guide member 16 and 18 further includes two contact rollers 30 (FIG. 4) which are mounted transversely within the U-shaped channels 20 to rollably engage the flexible drive element 15. Upper and lower spring clips, 36 and 38 are secured to the outer surfaces of the upper and lower stationary guide members 16 and 18 opposite the surface of the guide members containing the U-shaped channels 20. Left and right connecting side arms 40 and 42 are mounted within and secured by the spring clips 36 and 38 of the upper and lower stationary guide members 16 and 18 to adjustably secure the guide members a selected distance from one another (i.e., in a direction generally orthogonal to the longitudinal axis of each of the upper and lower runs of the drive element 15), thereby adjusting the tensioning device 10 so as to apply a suitable tensioning force to the drive element 15.

As shown in FIG. 1, the tensioning device 10 is free floating, supported solely by the flexible drive element 15 that interconnects the sprockets 12 and 14. In a preferred embodiment, the flexible drive element 15 consists of a drive belt. An upper run of the drive element 15 extends between the upper sides of the sprockets 12 and 14 and the lower run of the drive element 15 extends between the lower sides of the sprockets 12 and 14. The free floating tensioning device 10 locates between the two sprockets 12 and 14, pushing the upper and lower runs of the flexible drive element 15 towards each other. In this manner, the slack is removed from the drive element 15, thereby decreasing belt wear and substantially reducing the possibility that the belt will come off of one of the sprockets.

The lower surface of the upper stationary guide member 16 and the upper surface of the lower stationary guide member 18 each contain a U-shaped channel 20. Referring to FIG. 3, the bottom surface 22 of the U-shaped channels 20 is configured to form a substantially flat plane. Tile sidewalls 24 of the U-shaped channels 20 are approximately perpendicular to the bottom surface 22 of the channels. The U-shaped channels 20 of the stationary guide members 16 and 18 act to guide and center the belt drive 15 as it passes through the tensioning device 10. Preferably, however, the sidewalls 24 of the guide members 16 and 18 make infrequent contact with the belt drive 15 (or ideally no contact) so that friction between the belt drive 15 and the stationary guide members 16 and 18 is minimized. Instead, the belt drive 15 contacts only the contact rollers 30, as shown in FIG. 3. The guide members 16 and 18 are preferably formed of a low friction material, such as Nylon™ polyamide, to reduce friction in the event of contract with the belt 15. However, other materials such as steel or other metals may alternatively be utilized. In addition to lower friction, polymers such as polyamide are also preferred for construction of the guide members 16 and 18 because they are light weight.

Referring to FIG. 4, each stationary guide member 16 and 18 contains two contact rollers 30 that are mounted transversely within the U-shaped channels 20. The rollers 30 are preferably of a solid pin type design that does not contain an axle. This type of roller 30 tends to be more compact and advantageous than comparable axle-based rollers. The contact rollers 30 include reduced diameter ends that are journaled within annular bearing assemblies 44 that are in turn press fit into sidewall apertures 46 in the sidewalls 24 of the stationary guide members 16 and 18. The press-fit bearing assemblies 44 provide additional advantages in terms of compactness in this preferred embodiment design of the tensioning device 10. Each bearing assembly 44 includes an inner and an outer annular race, and a plurality of bearing members captured therebetween such as ball bearings. The apertures 46 are spaced apart longitudinally by a predetermined amount, such that the rollers 30 are mounted so as to be spaced apart longitudinally sufficiently to avoid cocking of the tensioning device 10 on the drive element 15, while still being compact in overall dimension. Thus, the spacing of the rollers 30 is predetermined such that the center to center spacing of the rollers 30 is approximately 1.0 to 3.0 times the width of the drive element contact surface of the rollers 30, and preferably approximately 1.0 to 2.0times the width of the contact surfaces of the rollers 30. The term "width of the contact surfaces" of the rollers is meant to refer to the distance measured along the longitudinal axis of the roller.

Additionally, the rollers have a relatively small diameter, with the diameter of the contact surface of the roller preferably being less than the width of the contact surface of the roller, and most preferably approximately ¼ to ¾ of the width of the contact surface of the roller. This also aids in providing a compact design. It should be appreciated that the size of the outer diameter of the contact rollers 30 is limited by the size of the outer diameter of the press-fit bearings 44, since the contact rollers 30 preferably should be able to pass through the sidewall apertures 46, for ease of assembly. Further, the diameter of the contact rollers 30 should preferably be towards the upper region of the acceptable diameter to width ratio for higher speed belt applications, since higher rotational speeds can be supported with larger diameter contact rollers 30.

In a preferred embodiment of the present invention, spring clips 36 and 38 are mounted to the upper surface of the upper stationary guide member 16 and the lower surface of the lower stationary guide member 18. As shown in FIG. 4, mounting screws 48 can be used to secure the spring clips 36 and 38 to the stationary guide members 16 and 18. However, an alternate embodiment of the present invention could utilize alternate securing methods to connect the mounting clips to the guide members such as adhesives. Preferably, the spring clips 36 and 38 are also configured to form U-shaped channels that will mount onto the outer surface of the stationary guide members 16 and 18. When mounted in this arrangement, the mounting clip sidewalls 50 formed by the U-shaped spring clips 36 and 38 at least partially cover the outer surfaces of the press-fit bearing assemblies 44 and as such help to retain the bearing assemblies 44 and rollers 30 within the sidewalls 24 of the guide members 16 and 18.

As most clearly shown in FIG. 4, in a preferred embodiment of the present invention the outer surface of the sidewalls 24 of the stationary guide members 16 and 18 contain recesses that are configured to accept the connecting side arms 40 and 42 such that when joined, the outer surface of the connecting side arms 40 and 42 are approximately flush with the outer surface of each sidewall 24 of the stationary guide members 16 and 18. This preferred embodiment further includes spring clips 36 and 38 that contain elongated apertures 52 in their bottom surfaces 54. These elongated apertures 52 are configured to allow the left and right connecting side arms 40 and 42 to pass through the spring clips 36 and 38 while the clips are secured to the guide members 16 and 18. When so installed, the longitudinal axes of the side arms 40 and 42 are oriented perpendicularly to the longitudinal axes of the retaining clips 36 and 38.

In the tensioning device 10, the connecting side arms 40 and 42 adjustably secure the stationary guide members 16 and 18 together such that the guide members can be positioned at a plurality of selected distances between each other. This ability to secure the upper and lower guide members 16 and 18 at several varying distances from one another is what allows a selected tensioning force to be applied to the flexible drive element 15. In a preferred embodiment of the present invention, the left and right connecting side arms 40 and 42 contain transversely disposed securing grooves 58, and the upper and lower spring clips 36 and 38 contain resiliently deformable securing flanges 56. When the connecting side arms 40 and 42 are inserted through the elongated apertures 52 of the spring clips 36 and 38, the securing grooves 58 and securing flanges 56 interact to form a ratchet-like mechanism which is arranged such that the force required to move the guide members 16 and 18 towards one another is smaller than the force required to move the guide members away from one another.

In alternative embodiments of the present invention (not shown), the connecting side arms 40 and 42 could contain a plurality of longitudinally spaced apertures through which the side arms could be screwed or otherwise mounted to the spring clips 36 and 38. This alternative embodiment is particularly well suited for larger belt idler applications since this alternative mounting technique can usually accommodate larger forces than a ratcheting mechanism. The connecting side arms 40 and 42 could alternatively be mounted directly to the stationary guide members 16 and 18 themselves (not shown), removing the need for the spring clips entirely. In this latter described alternate embodiment, the connecting side arms 40 and 42 may be designed in a wider configuration so as to at least partially cover the press-fit bearings 44 and thus help retain the bearings in the stationary guide members 16 and 18.

The present invention has been described in relation to a preferred embodiment and alternate embodiments. One of ordinary skill after reading the foregoing specifications, may be able to affect various other changes, alterations, and substitutions or equivalents without departing from the concepts disclosed. It is therefore intended that the scope of the letters patent granted hereon be limited only by the definitions contained in the appended claims and equivalents thereof.

The embodiments of the invention in which an exclusive property or privilege is claimed are defined as follows:

1. A tensioning device for a drive system having a flexible drive element that includes two runs, the tensioning device comprising:

a first stationary guide member having a surface defining a U-shaped guide channel, the guide channel forming sidewalls to assist in guiding the drive element;

a second stationary guide member having a surface defining a U-shaped guide channel, the guide channel forming sidewalls to assist in guiding the drive element;

each stationary guide member containing at least two contact rollers mounted in the guide channels for engaging with a corresponding one of the runs of the drive element; and at least one connecting side arm extending between and connected to the first and second stationary guide members to adjustably secure the members a selected distance from one another such that the first and second guide channels are spaced apart from and facing one another to apply a predetermined tensioning force to the two runs of the drive element captured and drawn together therebetween.

2. The tensioning device of claim 1, wherein the U-shaped guide channels of the stationary guide members have a substantially flat, non-curved channel bottom surface.

3. The tensioning device of claim 1, wherein the contact rollers are compact, unified one-piece wheel/axle pin rollers.

4. The tensioning device of claim 1, wherein the contact rollers are mounted in the sidewalls of the U-shaped guide channels in the stationary guide members.

5. A tensioning device for a drive system having a flexible drive element that includes two runs, the tensioning device comprising:

a first stationary guide member having a surface defining a U-shaped guide channel, the guide channel forming sidewalls to assist in guiding the drive element;

a second stationary guide member having a surface defining a U-shaped guide channel, the guide channel forming sidewalls to assist in guiding the drive element;

each stationary guide member containing at least two contact rollers mounted in the guide channels for engaging with a corresponding one of the runs of the drive element;

at least one connecting side arm extending between and connected to the first and second stationary guide members to adjustably secure the members a selected distance from one another such that the first and second guide channels are spaced apart from and facing one another to apply a predetermined tensioning force to the two runs of the drive element captured and drawn together therebetween; and wherein the contact rollers are mounted in the sidewalls of the U-shaped guide channels in the stationary guide members, and wherein the sidewalls of the U-shaped channels in the stationary guide members contain press-fit bearings that are adapted to rotatably secure the contact rollers.

6. The tensioning device of claim 1, wherein the stationary guide member are joined together by first and second connecting side arms.

7. The tensioning device of claim 1, wherein the stationary guide members include longitudinal outer surfaces, and the outer surfaces of the stationary guide members contain elongated recesses that run in a direction perpendicular to that of the U-shaped channel, the recesses being configured to house the connecting side arms.

8. The tensioning device of claim 1, wherein each stationary guide member contains a spring clip, the clips being configured to selectively secure the guide members to the at least one connecting side arm at a plurality of positions along the connecting side arm, thereby permitting adjustment of the spacing between the stationary guide members.

9. The tensioning device of claim 8, wherein the spring clips are configured in substantially U-shaped channels to locate onto the stationary guide members opposite the guide channels.

10. The tensioning device of claim 9, wherein the spring clips contain elongated apertures in the bottom floors of the U-shaped channels for receiving the connecting side arms.

11. A tensioning device for a drive system having a flexible drive element that includes two runs, the tensioning device comprising:

a first stationary guide member having a surface defining a U-shaped guide channel, the guide channel forming sidewalls to assist in guiding the drive element;

a second stationary guide member having a surface defining a U-shaped guide channel, the guide channel forming sidewalls to assist in guiding the drive element, each stationary guide member containing at least two contact rollers mounted in the guide channels for engaging with a corresponding one of the runs of the drive element;

at least one connecting side arm extending between and connected to the first and second stationary guide members to adjustably secure the members a selected distance from one another such that the first and second guide channels are spaced apart from and facing one another to apply a predetermined tensioning force to the two runs of the drive element captured and drawn together therebetween; and wherein each stationary guide member contains a spring clip, the clips being configured to selectively secure the guide members to the at least one connecting side arm at a plurality of positions along the connecting side arm, thereby permitting adjustment of the spacing between the stationary guide member, wherein the spring clips are configured in substantially U-shaped channels to locate onto the stationary guide members opposite the guide.

12. The tensioning device of claim 8, wherein the spring clips contain a ratchet-like mechanism arranged such that the force required to move the stationary guide members towards one another is smaller than the force required to move the stationary guide members away from one another.

13. The tensioning device of claim 1, wherein the tensioning device is free floating on the flexible drive element.

14. The tensioning device of claim 1, wherein each contact roller defines a drive element contact surface having a width measured along a longitudinal centerline of the contact roller, and the contact rollers are spaced apart such that the distance between the centerlines of the contact rollers is approximately 1.0 to 3.0 times the drive element contact surface width.

15. The tensioning device of claim 14, wherein the contact rollers are spaced apart such that the distance between the centerlines of the contact rollers is approximately 1.0 to 2.0 times the width of the contact surface of the rollers.

16. The tensioning device of claim 1, wherein each contact roller defines a drive element contact surface having a diameter and having a width measured along a longitudinal centerline of the contact roller, and wherein the diameter the contact surface of the rollers is less than the width of the contact surface of the rollers.

17. The tensioning device of claim 16, wherein the diameter of the contact surface of the rollers is approximately ¼ to ¾ of the width of the contact surface of the roller.

18. A tensioning device for a drive system having; a flexible belt drive that includes two runs, the tensioning device comprising:

a pair of stationary belt guides;

each stationary belt guide containing at least two contact rollers for engaging with a corresponding one of the runs of the belt drive;

at least one connecting side arm extending between the pair of stationary belt guides to adjustably secure the guides a selected distance from one another such that the contact rollers are spaced apart from and facing one another and apply a predetermined tensioning force to the two runs of the belt drive captured and drawn together therebetween; and each stationary belt guide containing a spring clip, the clips being configured to selectively secure the belt guides to the at least one connecting side arm at a plurality of positions along the connecting side arm, thereby permitting adjustment of the spacing between the stationary belt guides.

19. The tensioning device of claim 18, wherein the contact rollers are mounted in sidewalls of the U-shaped guide channels in the stationary belt guides.

20. A tensioning device for a drive system having a flexible belt drive including two runs, the tensioning device comprising:

a pair of stationary belt guides;

each stationary belt guide containing at least two contact rollers for engaging with a corresponding one of the runs of the belt drive;

at least one connecting side arm extending between and connected to the pair of stationary belt guides to adjustably secure the guides a selected distance from one another such that the contact rollers are spaced apart from and facing one another and apply a predetermined tensioning force to the two runs of the belt drive captured and drawn together therebetween; and each stationary belt guide containing a spring clip, the clips being configured to selectively secure the belt guides to the at least one connecting side arm at a plurality of positions along the connecting side arm, thereby permitting adjustment of the spacing between the stationary belt guides, wherein the contact rollers are mounted in sidewalls of the U-shaped guide channels in the stationary belt guides, and wherein the sidiewalls of the U-shaped channels in the stationary belt guides contain press-fit bearings that are adapted to rotatably secure the contact rollers.

21. The tensioning device of claim 20, wherein the spring clips contain side walls that locate over and retain the press-fit bearings and contact rollers in the side walls of the stationary belt guides.

22. A free floating tensioning device for a drive system having a flexible belt drive that includes two runs, said tensioning device being supportable solely by the drive belt, the tensioning device comprising:

a pair of stationary belt guides;

each stationary belt guide containing at least two contact rollers for engaging with a corresponding one of the runs of the belt drive; and two connecting side arms extending between and connected to the pair of stationary belt guides to adjustably secure the guides a selected distance from one another such that the contact rollers are spaced apart from and facing one another to thereby adjust the tensioning device, so as to apply a predetermined tensioning force to the two runs of the belt drive captured and drawn together therebetween.

23. The free floating tensioning device of claim 22, wherein each stationary belt guide contains a spring clip, the clips being configured too selectively secure the belt guides to the connecting side arms at a plurality of positions along the connecting side arm, thereby permitting adjustment of the spacing between the stationary belt guides.

24. The free floating tensioning device of claim 22, wherein each stationary belt guide contains an adjustable integral lock that secures the guides to the connecting side arms, thus allowing the guides to be positioned at selected distances from one another such that the contact rollers are spaced apart from and facing one another to thereby adjust the tensioning device, so as to apply a selectably tensioning force to the belt drive.

25. A tensioning device for a drive system having a flexible belt drive that includes two runs, the tensioning device comprising:

a pair of stationary belt guides;

each stationary belt guide containing at least two contact rollers for engaging with a corresponding one of the runs of the belt drive;

at least one connecting side arm extending between and connected to the pair of stationary belt guides to adjustably secure the guides a selected distance from one another such that the contact rollers are spaced apart from and facing one another and apply a predetermined tensioning force to the two runs of the belt drive captured and drawn together therebetween; and.

each contact roller defining a drive element contact surface having a width measured along a longitudinal centerline of the contact roller, wherein the contact rollers are spaced apart such that the distance between the centerlines of the contact rollers is approximately 1.0 to 3.0 times the drive element contact surface width.

26. A tensioning device for a drive system having a flexible belt drive that includes two runs, the tensioning device comprising:

a pair of stationary belt guides;

each stationary belt guide containing at least two contact rollers for engaging with a corresponding one of the runs of the belt drive;

at least one connecting side arm extending between and connected to the pair of stationary belt guides to adjustably secure the guides a selected distance from one another such that the contact rollers are spaced apart from and facing one another and apply a predetermined tensioning force to the two runs of the belt drive captured and drawn together therebetween; and each contact roller defining a drive element contact surface having a diameter and having a width measured along a longitudinal centerline of the contact roller, and wherein the diameter of the contact surface of the rollers is less than the width of the contact surface of the rollers.

* * * * *

UNITED STATES PATENT AND TRADEMARK OFFICE
CERTIFICATE OF CORRECTION

PATENT NO. : 6,083,132
DATED : July 4, 2000
INVENTOR(S) : H.F. Walker

It is certified that error appears in the above-identified patent and that said Letters Patent is hereby corrected as shown below:

| COLUMN | LINE | ERROR |
|---|---|---|
| 4 | 50 | "2.0times" should read --2.0 times-- |
| 7 (Claim 6, | 8 line 2) | "member" should read --members-- |
| 7 (Claim 11, | 55 line 27) | "member," should read --members,-- |
| 7 (Claim 11, | 58 line 30) | "guide." should read --guide channels, and wherein the U-shaped channel configured spring clips contain side walls that locate over and retain the press-fit bearings and contact rollers in the side walls of the stationary guide belts.-- |
| 8 (Claim 18, | 19 line 1) | after "having" delete ";" |

UNITED STATES PATENT AND TRADEMARK OFFICE
CERTIFICATE OF CORRECTION

PATENT NO. : 6,083,132
DATED : July 4, 2000
INVENTOR(S) : H.F. Walker

It is certified that error appears in the above-identified patent and that said Letters Patent is hereby corrected as shown below:

| COLUMN | LINE | ERROR |
|---|---|---|
| 8 (Claim 20, | 65 line 23) | "sidiewalls" should read --sidewalls-- |

Signed and Sealed this

Seventeenth Day of April, 2001

Attest:

NICHOLAS P. GODICI

Attesting Officer     Acting Director of the United States Patent and Trademark Office